United States Patent

Sayers et al.

(10) Patent No.: US 9,280,536 B2
(45) Date of Patent: Mar. 8, 2016

(54) SYNONYM DETERMINATION AMONG N-GRAMS

(71) Applicant: HEWLETT-PACKARD DEVELOPMENT COMPANY, L.P., Houston, TX (US)

(72) Inventors: Craig P Sayers, Menlo Park, CA (US); Meichun Hsu, Los Altos, CA (US); Chetan K Gupta, San Mateo, CA (US); Riddhiman Ghosh, Sunnyvale, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 432 days.

(21) Appl. No.: 13/852,882

(22) Filed: Mar. 28, 2013

(65) Prior Publication Data

US 2014/0297261 A1    Oct. 2, 2014

(51) Int. Cl.
    *G06F 17/27* (2006.01)
(52) U.S. Cl.
    CPC ........ *G06F 17/2795* (2013.01); *G06F 17/2765* (2013.01)
(58) Field of Classification Search
    CPC ............ G06F 17/2785; G06F 17/2795; G06F 17/30044; G06F 17/30731; G06F 17/30737
    USPC .................. 704/9, 10; 707/748, 750, 767, 725
    See application file for complete search history.

(56) References Cited

U.S. PATENT DOCUMENTS

| | | | |
|---|---|---|---|
| 5,283,737 A * | 2/1994 | Van Praag | G06F 17/2795 704/9 |
| 6,738,780 B2 * | 5/2004 | Bollacker et al. | 707/722 |
| 7,223,234 B2 | 5/2007 | Stupp et al. | |
| 7,483,829 B2 * | 1/2009 | Murakami et al. | 704/10 |
| 7,912,849 B2 * | 3/2011 | Ohrn | G06F 17/30654 707/602 |
| 8,032,508 B2 | 10/2011 | Martinez et al. | |
| 8,321,201 B1 * | 11/2012 | Baker | G06F 17/2795 704/9 |
| 8,543,381 B2 * | 9/2013 | Connor | G06F 17/2795 704/9 |
| 8,595,151 B2 * | 11/2013 | Hao | G06Q 10/00 705/1.1 |
| 8,762,370 B1 * | 6/2014 | Grushetskyy et al. | 707/727 |
| 8,825,571 B1 * | 9/2014 | Alfonseca et al. | 706/12 |
| 2007/0005566 A1 * | 1/2007 | Bobick et al. | 707/2 |
| 2009/0319518 A1 | 12/2009 | Koudas et al. | |
| 2010/0106486 A1 * | 4/2010 | Hua et al. | 704/9 |
| 2010/0293179 A1 * | 11/2010 | Chaudhuri et al. | 707/759 |
| 2011/0251839 A1 * | 10/2011 | Achtermann et al. | 704/9 |
| 2012/0078912 A1 * | 3/2012 | Gupta | G06F 11/3072 707/740 |
| 2013/0259362 A1 * | 10/2013 | Ghosh | G06F 17/30716 382/162 |
| 2013/0290232 A1 * | 10/2013 | Tsytsarau | G06N 99/005 706/46 |
| 2013/0346391 A1 * | 12/2013 | Hirate | 707/721 |

(Continued)

OTHER PUBLICATIONS

Chien et al., "Semantic Similarity between Search Engine Queries using Temporal Correlation", WWW'05 Proceedings of the 14th International Conferences on World Wide Web, May 10-14, 2005, pp. 2 to 11.*

(Continued)

*Primary Examiner* — Martin Lerner
(74) *Attorney, Agent, or Firm* — Hewlett Packard Enterprise Patent Department

(57) ABSTRACT

A technique includes obtaining a plurality of n-grams from a plurality of messages, determining a temporal histogram for each n-gram, and determining synonyms among the n-grams based on a combination of a correlation of the histograms and a distance measure between n-grams.

17 Claims, 10 Drawing Sheets

(56) References Cited

U.S. PATENT DOCUMENTS

| | | | |
|---|---|---|---|
| 2014/0039876 A1* | 2/2014 | Sayers | G06F 17/2785 704/9 |
| 2014/0058723 A1* | 2/2014 | Shen | G06F 17/2795 704/9 |
| 2014/0149417 A1* | 5/2014 | Kim | G06F 17/30699 707/740 |
| 2014/0215493 A1* | 7/2014 | Viswanathan | G06F 17/3061 719/318 |
| 2015/0205647 A1* | 7/2015 | Gupta | G06F 11/008 719/318 |

OTHER PUBLICATIONS

Sayers et al., "Extracting Interesting Related Context-Dependent Concepts From Social Media Streams Using Temporal Distributions," ICDE 2013: 29th IEEE Intl Conf on Data Engineering, Brisbane, Australia, Apr. 8-11, 2013, 4 p.

Groh et al., "Spatio-Temporal Small Worlds for Decentralized Information Retrieval in Social Networking," Sep. 13, 2012, 10 p.

Santoro et al., "Time-Varying Graphs and Social Network Analysis: Temporal Indicators and Metrics," Feb. 3, 2011, 6 p.

\* cited by examiner

SYNONYM DETERMINATION AMONG N-GRAMS

BACKGROUND

Social media is generally characterized by large volumes of messages such as text message and the like. It can be very cumbersome for humans to read through large volumes of such messages to discern the concepts being discussed.

BRIEF DESCRIPTION OF THE DRAWINGS

For a detailed description of various examples, reference will now be made to the accompanying drawings in which.

DETAILED DESCRIPTION

An example of a computing system is described herein that is programmed to attempt to discern concepts of interest being discussed in messages. As used herein, the term "message" broadly refers to any type of human-generated communication. Examples of messages include text messages, emails, tweets via Twitter, etc. One problem in programming a computer to discern such concepts is that humans tend to refer to the same concept using different words and spellings. For example, one person might express her congratulations to the winner of an Academy award by typing "Congratulations to," while another person attempting to communicate the same concept may type "congrats to." In this example, "Congratulations to" and "congrats to" are synonyms for the same concept. The principles discussed herein pertain to techniques for determining synonyms among various messages. In general, synonyms are determined by obtaining "n-grams" of the messages to be analyzed, determining temporal histograms of the n-grams, correlating the histograms to each other (e.g., temporal correlation), computing distance measures among the n-grams (e.g., character-based distance measures), and selecting a synonym based on the histogram correlations and the distance measures. Highly correlated n-grams that have a low distance measure are more likely to be synonyms than n-grams that are not as correlated and/or that have a higher distance measure.

An n-gram is a number "n" of sequential words in a phrase or sentence of a message. For example, the sentence "I saw the movie" has the following 10 n-grams.

"I"
"saw"
"the"
"movie"
"I saw"
"saw the"
"the movie"
"I saw the"
"saw the movie" and
"I saw the movie"

The first four n-grams listed above (I, saw, the, movie) are one-word n-grams (n=1). The next three n-grams (I saw, saw the, the movie) are two-word n-grams (n=2). The next two n-grams (I saw the, saw the movie) are three word n-grams (n=3), and the last n-gram (I saw the movie) is a four-word n-gram (n=4). Thus, a sentence or phrase can be parsed into its constituent n-grams. A message may contain only a single phrase or sentence or multiple phrases or sentences. The entire content of a given message may be parsed into its various n-grams.

In some implementations, a limit is imposed on "n" and thus a limit is imposed on the largest n-grams involved in parsing the messages into the constituent n-grams. For example, despite sentences or phrases in a message being of an arbitrary length (e.g., a sentence may have 30 words), the generation of the n-grams from such sentences may be limited to a maximum length of n=20 in some examples. In that case, the largest n-gram would have 20 words.

Figure 1:
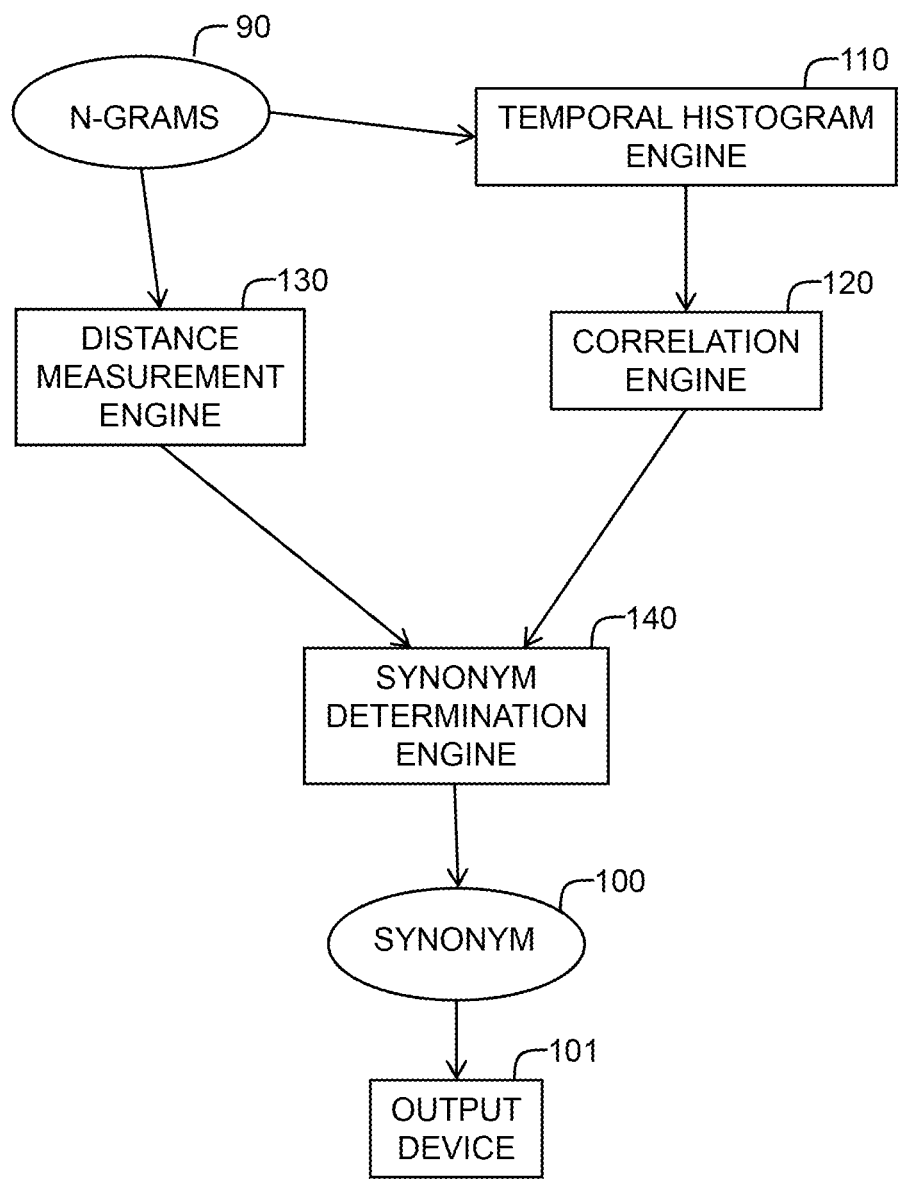
FIG. 1 shows a system in accordance with the disclosed principles.

FIG. 1 shows an example of a computing system in accordance with the disclosed principles for determining synonyms of n-grams parsed from messages. As shown, the system includes a temporal histogram engine 110, a correlation engine 120, a distance measurement engine 130, and a synonym determination engine 140. A plurality of n-grams 90 are provided to the system and synonym determination engine 140 determines which n-grams are synonyms and may further select one of the n-grams determined to be a synonym (synonym 100) for presentation to a user (e.g., to be displayed on output device 101).

The n-grams 90 input to the system may be obtained in any suitable fashion. For example, a volume of messages may have already been parsed into the constituent n-grams and the n-grams may have been stored on a storage device.

Figure 2:
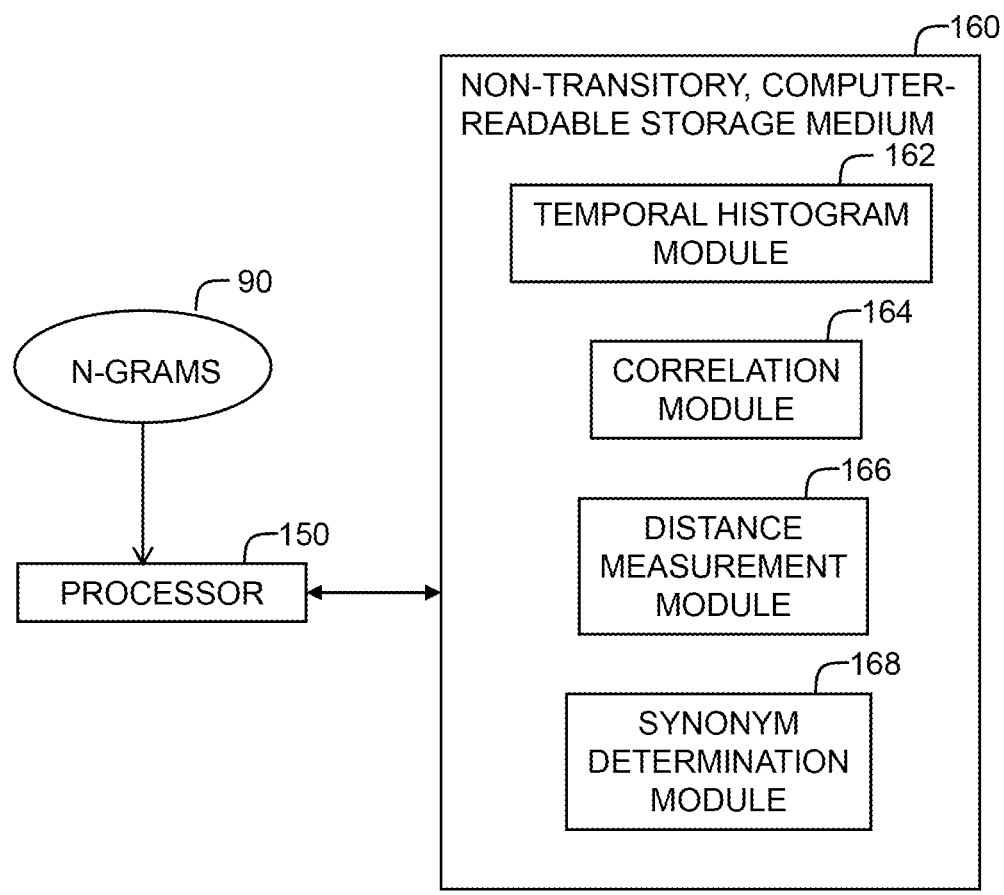
FIG. 2 shows another system in accordance with the disclosed principles.

The various engines 110-140 shown in FIG. 1 may provide the system with the functionality described herein. In some implementations, the functionality of two or more or all of the engines may be implemented as a single engine. Each engine 110-140 may be implemented as a processor executing software. FIG. 2, for example, shows one suitable example in which a processor 150 is coupled to a non-transitory, computer-readable medium 160. The non-transitory, computer-readable medium 160 may be implemented as volatile storage (e.g., random access memory), non-volatile storage (e.g., hard disk drive, optical storage, solid-state storage, etc.) or combinations of various types of volatile and/or non-volatile storage devices.

The non-transitory, computer-readable storage medium 160 is shown in FIG. 2 to include a software module that corresponds functionally to each of the engines of FIG. 1. The software modules may include a temporal histogram module 162, a correlation module 164, a distance measurement module 166, and a synonym determination module 168. Each engine of FIG. 1 may be implemented as the processor 150 executing the corresponding software module of FIG. 2.

The distinction among the various engines 110-140 and among the software modules 162-168 is made herein for ease of explanation. In some implementations, however, the functionality of two or more of the engines/modules may be combined together into a single engine/module. Further, the functionality described herein as being attributed to each engine 110-140 is applicable to the processor 150 executing the software module corresponding to each such engine, and the functionality described herein as being performed by a given module being executed by processor 150 is applicable as well as to the corresponding engine.

The messages 90 from which the n-grams are derived may be timestamped (e.g., based on the origination of the message). The messages may be allocated to time bins (also called "buckets"). Each time bin is associated with a specific time or time range, and each message is allocated to a specific time bin based on the time stamp of the message. In some implementations, the time bins are sized so that the number of messages is the same across the various time bins. Equi-height binning results in more bins for times when there are numerous messages and conveniently avoids empty bins.

Figure 3:
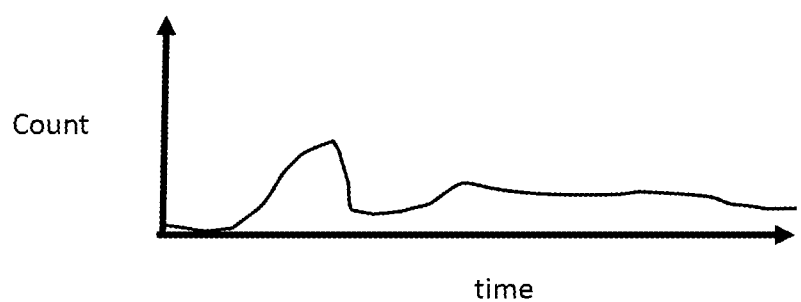
FIG. 3 shows an example of a histogram in accordance with the disclosed principles.

Each n-gram itself also has a timestamp corresponding to the timestamp of the message from which it was derived. The temporal histogram engine 110 determines a histogram for each n-gram 90 from the binned messages. Any given n-gram may be found in multiple messages in the same or multiple bins. Each histogram specifies the number of occurrences of a particular n-gram as a function of time. FIG. 3 illustrates an example of a histogram for an n-gram. The height of the histogram at each point in time indicates the number of messages at that point in time that contains the n-gram.

The initial set of n-grams 90 being analyzed may have already been processed to remove certain high volume n-grams known not to be of any interest such as "a," "an," "the," etc.

Figure 4:
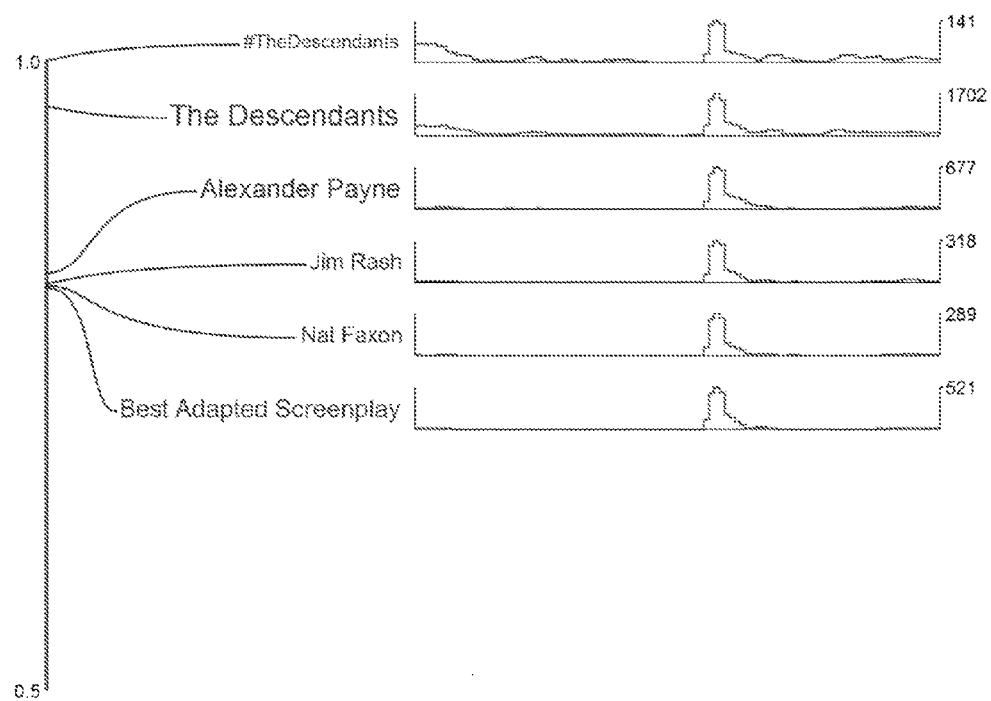
FIG. 4 shows an example of correlated histograms in accordance with the disclosed principles.

The correlation engine 120 may be used to compute a correlation between any two or more histograms of different n-grams. Any suitable correlation technique can be used to correlate two n-gram histograms such as Pearson's Correlation Coefficient technique. FIG. 4 shows an example of the histograms of 7 n-grams from messages (tweets in this example) obtained around the time of the 2012 Academy Awards. The n-grams include "#The Descendants," "The Descendants," "Guion Adaptado," "Alexander Payne," "Jim Rash," "Nat Faxon," and "Best Adapted Screen Play." As can be seen, the histograms for these 7 n-grams closely match each other, which indicates that they may be related to each other because they were mentioned in many tweets from many different users at around the same time.

The distance measurement engine 130 (FIG. 1) computes a distance measure between a pair of n-grams. The distance measure may be a character-based distance measure that reflects the number of alphanumeric character differences between two n-grams. For example, a distance measure between the n-grams "Congratulations to" and "congrats to" is 8–the 7 characters "ulation" plus the single capitalization difference of the first letter. More complex distance measures may also be employed by giving different weights to different editing operations. For example, changing capitalization may be given a low weight, while inserting an additional character has a higher weight.

Figure 5:
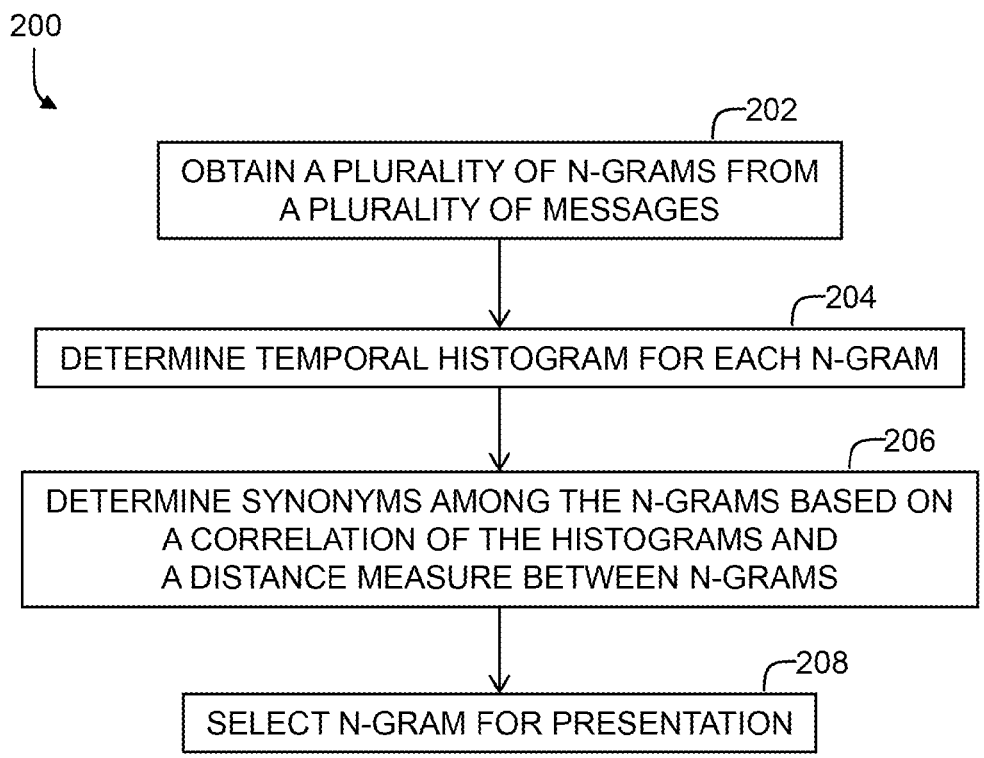
FIG. 5 shows a method in accordance with the disclosed principles.

FIG. 5 illustrates a method 200 in accordance with an example. For each n-gram 90, the method determines which, if any, of the other n-grams are synonyms to that n-gram. The method may be repeated for one or more or all of the other n-grams 90.

FIG. 5 shows an example of a method for determining synonyms of n-grams. The method of FIG. 5 will be discussed with reference to FIG. 1. At 202, a plurality of n-grams is obtained from a plurality of messages. Such n-grams may be n-grams 90. In some implementations, operation 202 may include parsing the messages into n-grams, while in other implementations operation 202 may include retrieving already-parsed n-grams from storage (e.g., non-transitory, computer-readable medium 160).

At 204, the method includes determining a temporal histogram for each n-gram. This operation may be performed by temporal histogram engine 110. At 206 and as further explained below, the method includes determining synonyms among the various n-grams based on a correlation of the histograms and a distance measure between n-grams. Further, at 208 a synonym from among the synonyms is selected for presentation.

In some implementations, the histogram for each n-gram is correlated against the histograms of all other n-grams using the correlation engine 120. A high degree of histogram correlation between two or more n-grams is an indicator that such n-grams may be synonyms, whereas n-grams whose histograms are substantially uncorrelated likely are not synonyms.

The distance measure may be computed using the distance measurement engine 130. N-grams that have a small distance measure are more likely to be synonym than n-grams with large distance measures.

In general, n-grams whose histograms are highly correlated and that have small distance measures are likely to be synonyms. N-grams whose histograms have a low degree of correlation and/or have large distance measures are less likely to be synonyms. The synonym determination engine 140 receives the correlation values determined by the correlation engine 120 and the distance measures determined by the distance measurement engine 130 and determines which n-grams are synonyms, if any, of each n-gram 90.

Figure 6:
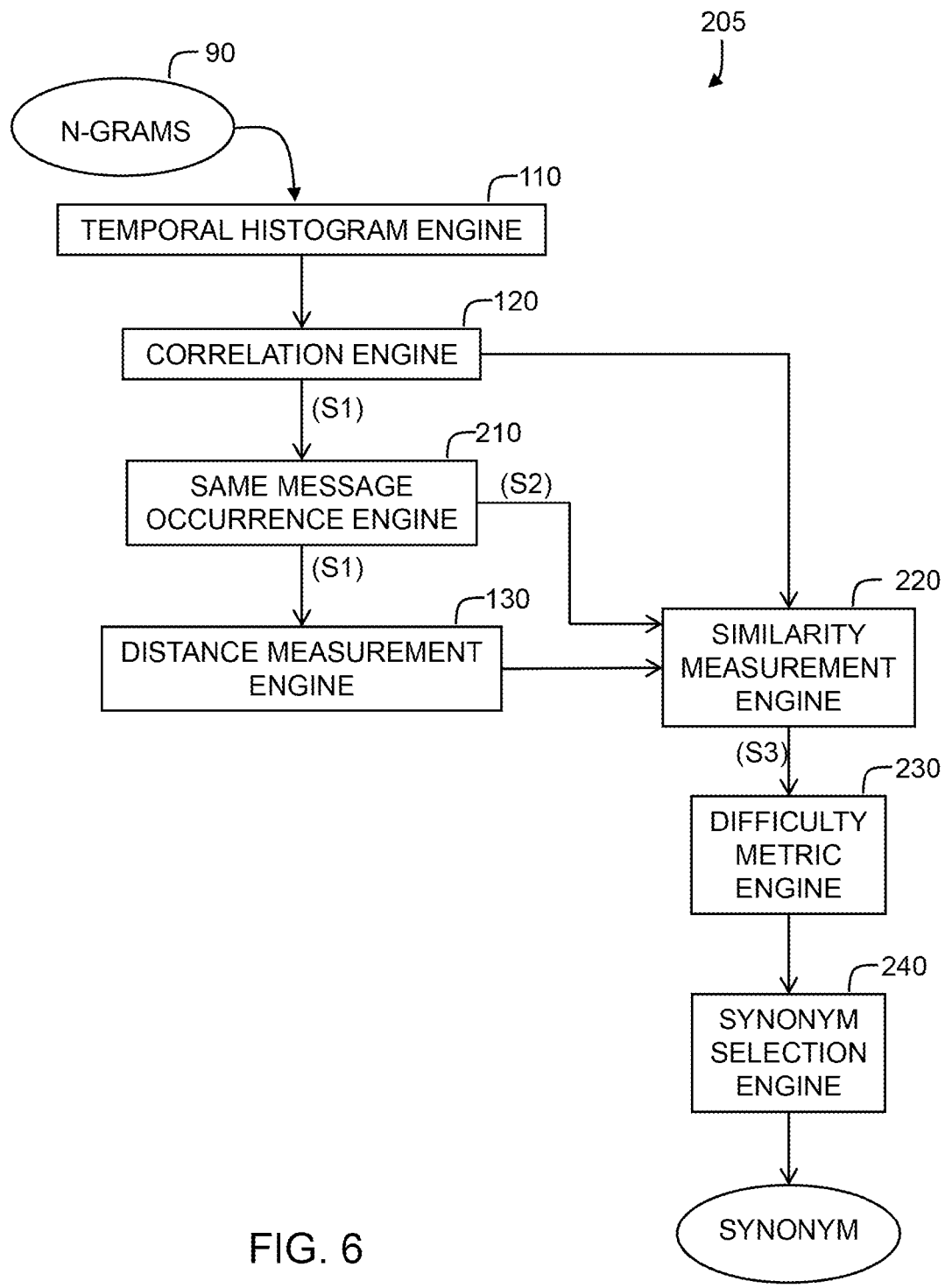
FIG. 6 shows yet another system in accordance with the disclosed principles.

FIG. 6 shows another system implementation 205 in accordance with another example. Temporal engine 110, correlation engine 120, and distance measurement engine 130 are used in this system as shown. The system 205 also includes a same message occurrence engine 210, a similarity measurement engine 220, a difficulty metric engine 230, and a synonym selection engine 240.

The same message occurrence engine 210 determines the frequency with which two or more n-grams occur in the same message (a "co-occurrence" value). Two n-grams that frequently occur in the same message are less likely to be synonyms, despite having highly correlated histograms, as compared to two n-grams that typically do not occur in the same message. For example, it is not likely that messages will frequently have both n-grams "Congratulations to" and "congrats to" in the same message—the idea being that a person typing one of those n-grams is not likely to type other n-gram as well in the same message. But, the correlated n-grams "The Descendants" and "The Best Adapted Screenplay" (FIG. 4) frequently do occur in the same messages for the 2012 Academy Awards message set.

In some implementations, the similarity measurement engine 220 computes a similarity measure between a pair of n-grams based on the correlation of the n-grams' histograms and the distance measure for that pair of n-grams. More specifically, the similarity measurement engine 220 may compute a similarity measure between a pair of n-grams as a function of the temporal similarity, the distance measure, and the co-occurrence. In some implementations, the similarity measure is computed based on a weighted sum, where the weights are positive for temporal similarity, negative for the distance measure, and negative for the co-occurrence value. By taking into account the histograms, the distance measures and the co-occurrence value, the similarity measure will thus be high for two n-grams that are highly correlated and that have a low distance measure and a low level of co-occurrence value. By contrast, two n-grams whose histograms are less correlated or that have a relatively high distance measure, or a relatively high level of co-occurrence will have a relatively low similarity measure. Thus, the similarity measure may take into account the degree of correlation, the level of co-occurrence, and the distance measure.

The difficulty metric engine 230 computes a difficulty metric for an n-gram. The difficulty metric is an indicator of how difficult it is for a human to type the n-gram. Difficulty metrics are used to select from among a set of possible synonyms one (or more) synonym in particular to present to the user as the most likely candidates for the correct spelling of the n-gram. Because users have gone through the effort of typing difficult to type n-grams, a popular and difficult to type n-gram probably represents the correct spelling of the n-gram. Factors that may be taken into account by the difficulty metric engine 230 include spaces, capitalization and diacritical marks (e.g., accents). Capitalization generally requires two keys to be pressed as is the case with diacritical marks. In some examples, the difficulty metric assigns a value of +1 for each space in the n-gram, +1 for each capital letter and +1 for each diacritical mark. The total of such values for the various elements is computed as the difficulty metric for the n-gram. As in the earlier distance measure, different weights may also be given to the different factors. For example, the addition of diacritical marks may be given a high weight, while a change in capitalization may have a weight which is lower, or even zero.

From among the candidate of synonyms, the synonym selection engine 240 selects at least one n-gram for presentation (e.g., display) to the user based on the difficulty metrics and how popular it was because a synonym which occurs only a few times is probably a typographic error, while a synonym which occurs very often but is very easy to type may be just a common simplification. For example, the synonym selection engine may threshold variations written by fewer than 10% of the authors, and then select among those which remain, the one with the highest difficulty metric. Table I below illustrates the variations in case and diacritical marks of the name Bérénice Bejo in an example set of messages from within tweets.

TABLE I

| Variations | |
|---|---|
| Text variant | Count |
| BÉRÉNICE Bejo | 1 |
| BeRenice bejo | 1 |
| Berenicé Bejo | 1 |
| berénice bejo | 1 |
| Bérenice Béjo | 2 |
| Berenice Bejó | 2 |
| Bèrènice Bejo | 2 |
| Berenice BEjo | 2 |
| Bérénice bejo | 2 |
| berenice Bejo | 3 |
| Berenice Béjo | 3 |
| Bérenice Bejo | 7 |
| BÉRÉNICE BEJO | 8 |
| Bérénice Béjo | 20 |
| bérénice bejo | 20 |
| BERENICE BEJO | 49 |
| Berenice bejo | 65 |
| berenice bejo | 177 |
| Bérénice Bejo | 1097 |
| Berenice Bejo | 3564 |

In this case there were 20 different variations and the "count" specifies the number of instances the corresponding variation occurred in the message set. The first entry in the table (BÉRÉNICE Bejo) only occurred in one message, while the last entry (Berenice Bejo) was the most popular and was found in 3564 messages. Notice that even though it is the most popular in these tweets, it is not the best variant. Referring to this example, thresholding the unpopular variations removes those which are likely typographical errors. Of the remaining entries, many would have been determined to be synonyms, but the synonym selection engine 240 would have selected the second to last entry (Bérénice Bejo) as the synonym to be presented to the user because it was very popular and it had a larger difficulty metric given its capital letters and diacritical marks.

Having determined synonyms using the methods described herein, implementations can then use that knowledge to perform more accurate computations and display more accurate information to the user. For example, if the user asked "How many people tweeted about "Bérénice Bejo," then knowing that that n-gram has several synonyms, the system can count the number of people who tweeted any one of those synonyms. In this case, that includes the popular synonym "Berenice Bejo", producing a much more accurate result.

Figure 7:
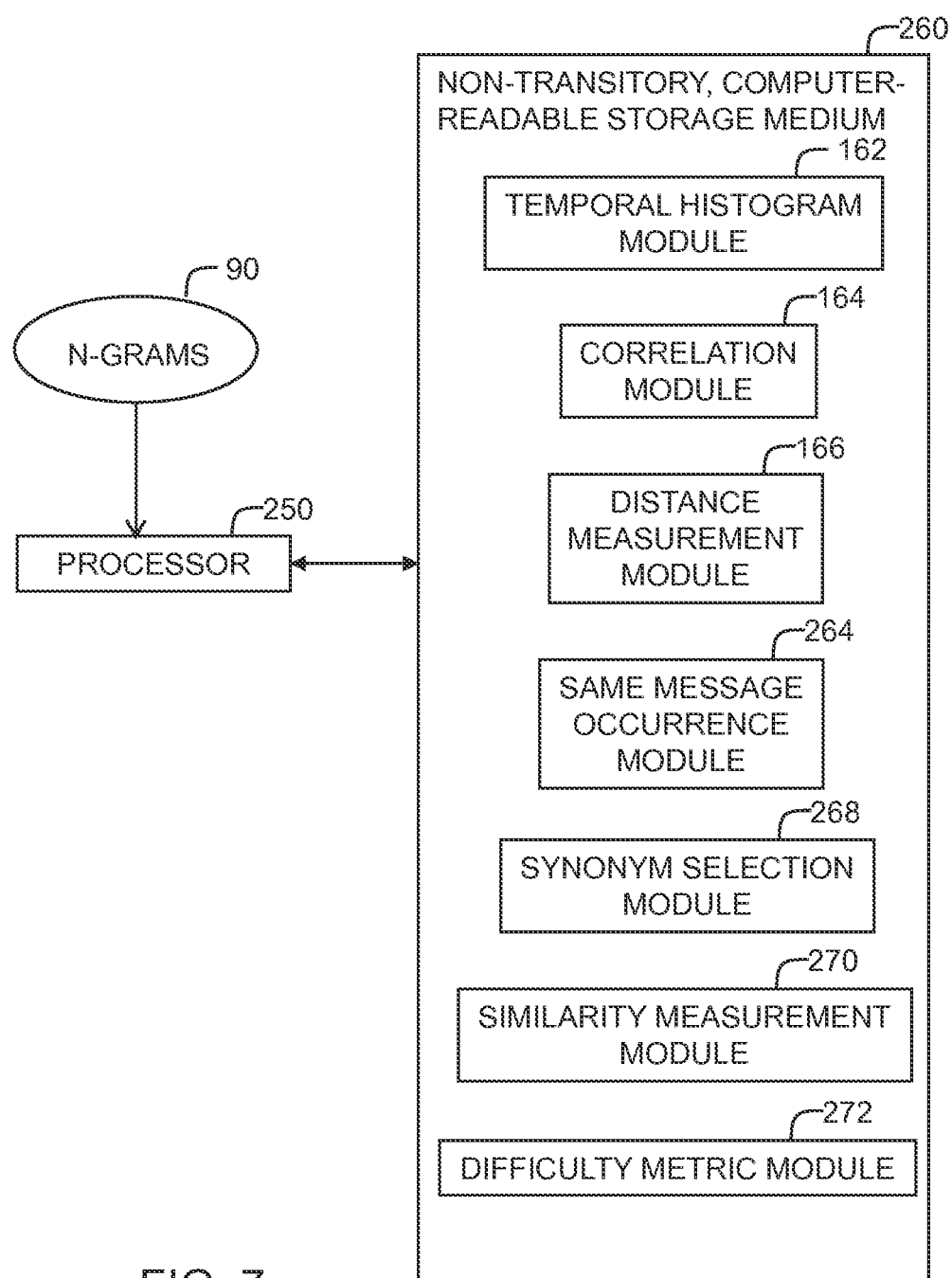
FIG. 7 shows another system in accordance with the disclosed principles.

FIG. 7 illustrates an implementation of system 205 of FIG. 6. The various engines 110-130 and 210-240 shown in FIG. 6 may provide the system with the functionality described herein. In some implementations, the functionality of two or more or all of the engines may be implemented as a single engine. Each engine 110-130 and 210-240 may be implemented as a processor executing software. FIG. 7, for example, shows one suitable example in which a processor 250 is coupled to a non-transitory, computer-readable medium 260. The non-transitory, computer-readable medium 260 may be implemented as volatile storage (e.g., random access memory), non-volatile storage (e.g., hard disk drive, optical storage, solid-state storage, etc.) or combinations of various types of volatile and/or non-volatile storage devices.

The non-transitory, computer-readable storage medium 260 is shown in FIG. 7 to include a software module that corresponds functionally to each of the engines of FIG. 6. The software modules may include the temporal histogram module 162, the correlation module 164, the distance measurement module 166, a same message occurrence module 264, a synonym selection module 268, a similarity measurement module 270, and a difficulty metric module 272. Each engine of FIG. 6 may be implemented as the processor 250 executing the corresponding software module of FIG. 7.

The distinction among the various engines 110-130 and 210-240 and among the software modules 162-166 and 264-272 is made herein for ease of explanation. In some implementations, however, the functionality of two or more of the engines/modules may be combined together into a single engine/module. Further, the functionality described herein as being attributed to each engine 110-130 and 210-240 is applicable to the processor 250 executing the software module corresponding to each such engine, and the functionality described herein as being performed by a given module executed by processor 250 is applicable as well as to the corresponding engine.

The operation of system 205 of FIG. 6 will now be described with regard to the method of FIG. 8. Reference is also be made to FIG. 9. For each n-gram 90, the system determines which, if any, of the other n-grams are synonyms to that n-gram (referred to as the "n-gram to be analyzed"). The process may be repeated for one or more or all of the other n-grams 90.

At 302, a plurality of n-grams is obtained from a plurality of messages. The n-grams for which histograms are determined may be "popular" n-grams. A popular n-gram may be a frequently occurring n-gram (e.g., an n-gram occurring excess of a threshold) or an n-gram that is very similar to a frequently occurring n-gram (e.g., varying only by case or diacritical mark) The n-grams 90 are provided to the temporal histogram engine 110 which computes the histograms of the various n-grams as explained previously (304). Operations 306-322 are performed for each n-gram to be analyzed and thus may be repeated for each such n-gram.

The histogram correlations are provided to the correlation engine 120. In some implementations, only the n-grams meeting a minimum level of occurrence (preset or adjustable) are included in the analysis. The correlation engine 120 then correlates (e.g., using Pearson's Correlation Coefficient) the histogram of the n-gram to be analyzed to the histograms of all other n-grams (306). The correlation engine 120 not only computes the correlations but also thresholds the n-grams 90 based on the correlations. That is, the correlation engine 120 may eliminate from consideration as synonyms those n-grams whose correlation coefficient is less than a particular threshold. The correlation threshold may be preset or user-adjustable. Those n-grams having a correlation coefficient in excess of the threshold (310) are included in a set S1 of n-grams.

Set S1 is illustrated in FIG. 6 as the output of the correlation engine 120. FIG. 9 illustrates that n-grams 90 are thresholded based on the histogram correlations being greater than a threshold to produce set S1 of n-grams. The set S1 of n-grams will be further thresholded based on other factors as explained below to eventually result in set S3, which includes the synonyms for the n-gram to be analyzed.

At 312, the method includes thresholding set S1 based on the frequency of occurrence of n-grams in the same message as the n-gram to be analyzed. The result of thresholding set S1 in this manner results in set S2. Operation 312 may be performed by the same message occurrence engine 210. Only those n-grams from set S1 are included in set S2 that have a frequency of occurrence in the same message as the n-gram to be analyzed that is less than a particular threshold (preset or dynamically adjusted). The n-grams in set S2 thus are n-grams whose histograms have been determined to be highly correlated to the histogram of the n-gram to be analyzed (greater than a threshold) and that typically do not occur in the same message as the n-gram to be analyzed. As explained above, n-gram that typically do occur in the same message are deemed unlikely to be synonyms. FIG. 9 illustrates that set S1 is thresholded based on the frequency of occurrence in the same message to produce set S2.

Figure 8:
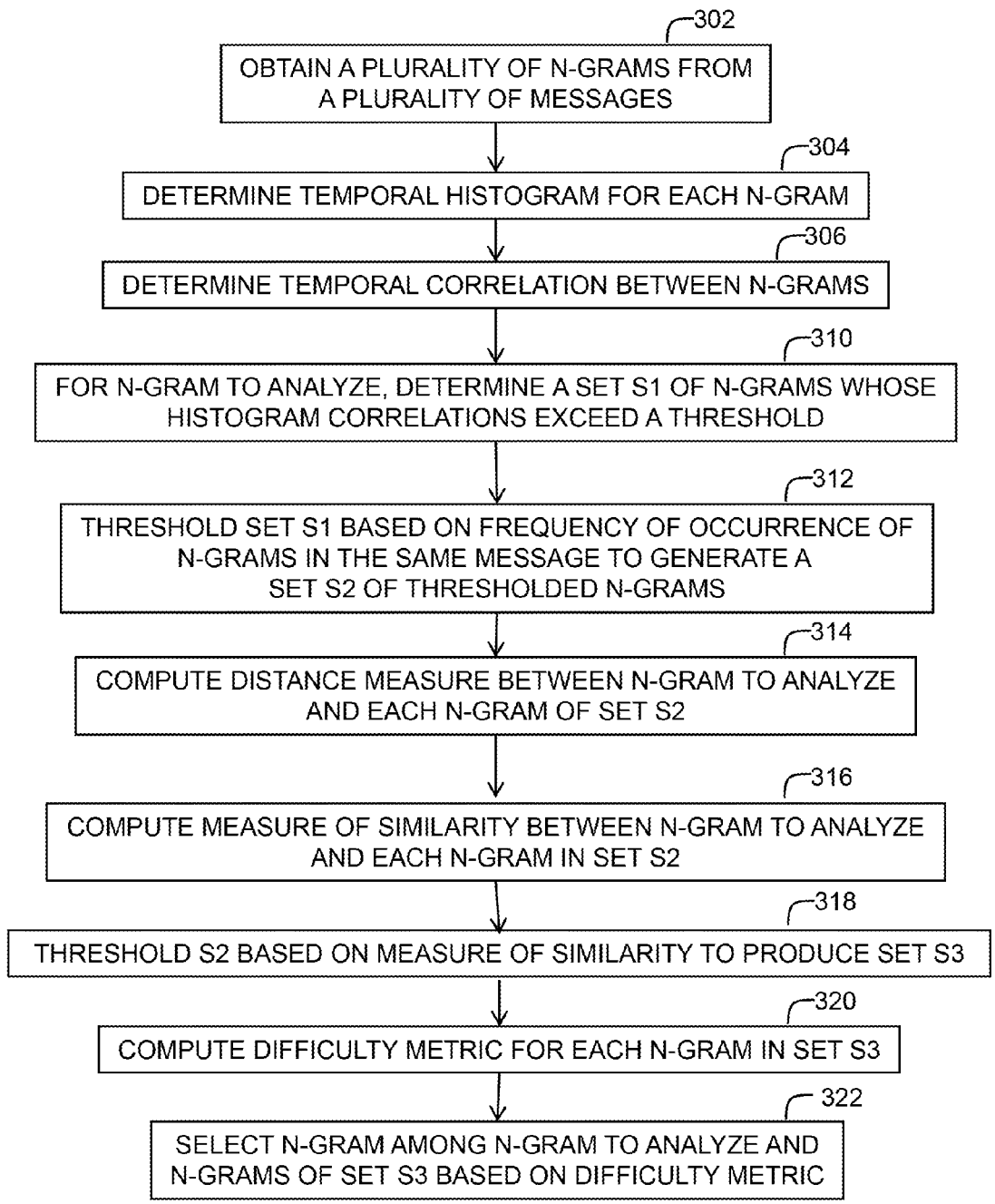
FIG. 8 shows a method in accordance with the disclosed principles.
Figure 9:
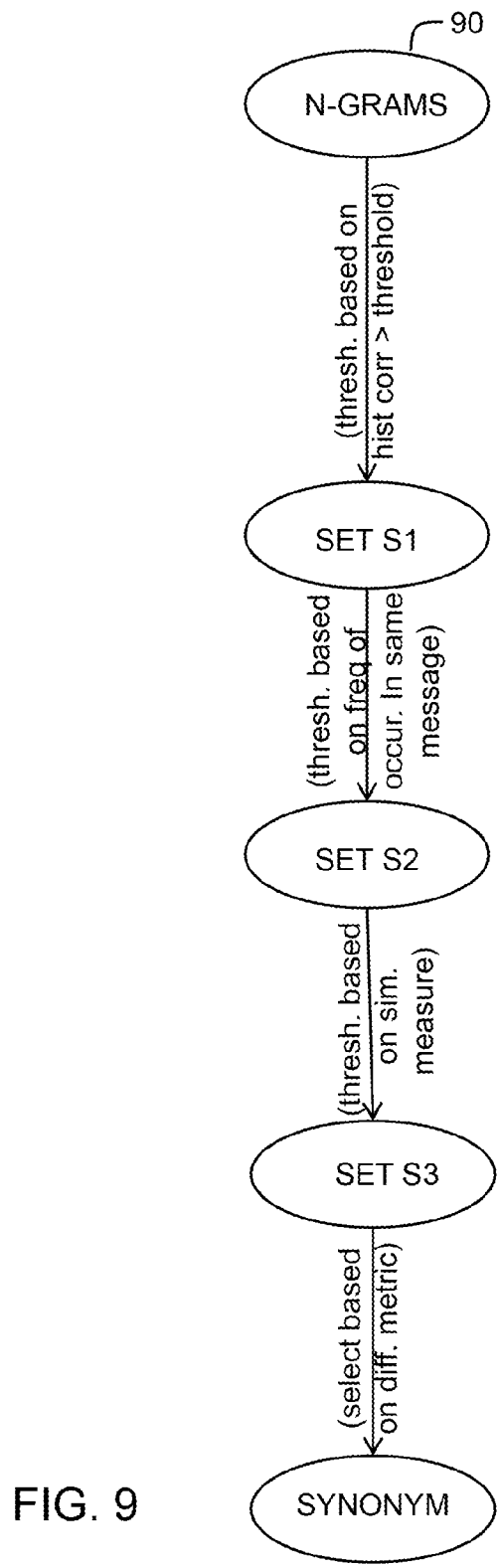
FIG. 9 illustrates the thresholding of n-grams based on various factors in accordance with the disclosed principles.

At 314 in FIG. 8, the method includes computing the distance measure between the n-gram to be analyzed and each n-gram in set S2. This operation may be performed by the distance measurement engine 130 as explained above. The set S2 of n-grams (and their histograms) from the same message occurrence engine 210 and the distance measures from the distance measurement engine 130 then are provided to the similarity measurement engine 220.

At 316, the similarity measurement engine 220 computes the measure of similarity between the n-gram to be analyzed and each n-gram of set S2. As explained above, the similarity measurement engine 220 computes a similarity measure for the n-gram to be analyzed relative to each n-gram of set S2 based on the histogram correlation coefficient and the distance measure (e.g., weighted sum of correlation coefficient and negative of distance measure).

At 318, set S2 of n-grams is thresholded based on the similarity measure to produce a set S3 of n-grams. FIG. 9 also illustrates the derivation of set S3 from set S2 based on the similarity measure. This operation may be performed by the similarity measurement engine 220. Thus, set S3 includes, for the n-gram to be analyzed, those n-grams from the initial population of n-grams 90 that meet the following criteria:
  Have histograms that are highly correlated to the n-gram to be analyzed
  Typically do not occur in the same message as the n-gram to be analyzed
  Have a relatively small distance measure
Set S3 thus includes the synonyms determined by system 205 to exist among n-grams 90 for the n-gram to be analyzed.

The system 205 then determines which n-gram among the synonyms and the n-gram to be analyzed should be presented to the user (e.g., for display). At 320, the method includes computing a difficulty metric for each n-gram in set S3. This operation may be performed by the difficulty metric engine 230 based on, for example, number of spaces, capitalization and diacritical marks. The synonym selection engine 240 then selects the n-gram having the largest difficulty metric (322) as the synonym to be presented.

Some messages may include a tag. A tag in a message is identified by an agreed-upon symbol that normally would not be found in a message. For example, the symbol may be "#". The symbol is included immediately before a word or phrase (no spaces) as a way to identify that particular word or phrase. The tag is the combination of the symbol and the word or phrase following the symbol to which the symbol thus applies. Social media users may include tags in their messages as a way to provide ready identification of certain desired concepts. Typically each tag refers to a concept, and the tag is created from a name for that concept so that it is still readily identifiable and also relatively unique and relatively short. Commonly-used tag creation operations include prepending the symbol "#", removing spaces and hyphens, starting each new word with a capital letter, and abbreviating longer words. For example, one way to create a tag corresponding to the name "Hewlett-Packard Labs" would be as "#HPLabs."

Figure 10:
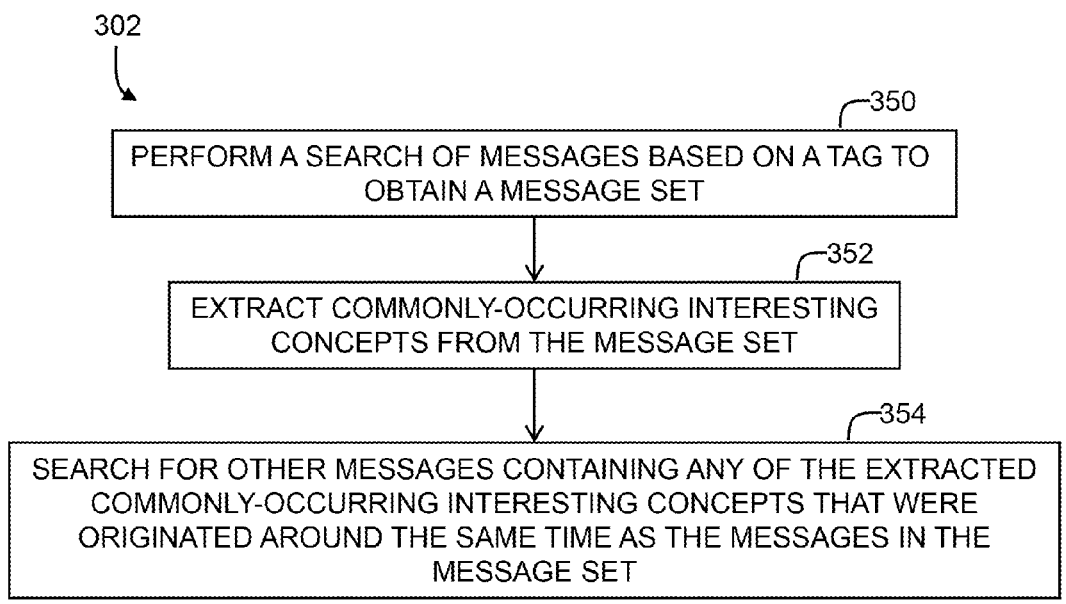
FIG. 10 shows a method in accordance with the disclosed principles.

A user may desire to know the meaning of a particular tag encountered in a message. The method of FIG. 8 with one or more modifications can largely be used in this regard. In FIG. 8, operation 302 is to obtain a plurality of n-grams from a plurality of messages. FIG. 10 illustrates an implementation of operation 302 when attempting to discern the meaning of a particular tag. At 350, the method includes performing a search of messages based on the desired tag. The result of the search is a plurality of messages containing the particular tag.

The operation at 352 includes extracting commonly-occurring interesting concepts from the plurality of messages from the search. The interestingness of an n-gram may be determined by a statistical analysis of the histograms of the various n-grams. For example, the frequency of the n-grams within each time bin and all bins provides an interestingness factor or coefficient. In various implementations, n-grams which occur relatively uniformly across all time bins are deemed less interesting. Further, various statistical computations, factors, coefficients, or combinations thereof may be involved in determining the interestingness of the n-grams.

In exemplary implementations, determining the interestingness of the n-grams in the various messages includes scaling each n-gram frequency across the histogram. More specifically, the interestingness of a candidate n-gram may be calculated as a weighted average from a sum of the scaled temporal distribution.

$$A' = [a'_1, a'_2, a'_3, \ldots a'_n]; \; a'_i = a_i/\max(A) \quad \text{(Eq. 1)}$$

where A' is the scaled temporal distribution of the n-grams, $a'_1, a'_2, a'_3, \ldots a'_n$ are the scaled versions of the number of n-grams in each bin relative to the maximum of the histogram (e..., $a'_i = a_i/\max(A)$ where $a_i$ is the number of n-grams in the ith bin and max(A) is the maximum value of the histogram).

Determining the interestingness of n-grams may include the calculation in Equation 2:

$$I(A') = 1 - G^{-1}[\Sigma a'_i \text{ (for all } i, 1 \text{ to } G)] \quad \text{(Eq. 2)}$$

where I is the interestingness for the scaled temporal distribution A', G is the number of bins, and $a'_i$ is the scaled number of candidate n-grams in a bin i. The result is the average frequency of the n-gram. Subtracting the average frequency from 1 (i.e., 100% frequency) results in a measure of interestingness. Thus, with a lower weighted average frequency of the candidate n-gram in each bin and across all bins, it is determined to be more interesting.

In other exemplary implementations, determining the interestingness of the candidate n-grams includes determining the coefficient of variation of the temporal distribution for each candidate n-gram. The variation of the temporal distribution is calculated from the average frequency of the candidate n-gram in each bin and the standard deviation thereof. More specifically, the product of the standard deviation divided by the average frequency of the candidate n-gram determines interestingness as shown in Equation 3:

$$I(A) = \text{Std. Dev}(A)/\text{Mean}(A) \quad \text{(Eq. 3)}$$

wherein, I is the interestingness factor for the temporal distribution A. In this implementation, high variation of the candidate n-grams within the temporal distribution bins provides a higher interestingness factor. The interestingness factor for each candidate bin may have a predetermined minimum, maximum, or a combination thereof. Further, the interestingness factor minimum, maximum, or a combination thereof may be controllable or alterable by a user.

Referring still to FIG. 10, at 354, the method includes searching for other messages containing any of the extracted commonly occurring interesting concepts that were originated around the same time as the messages in the plurality of messages resulting from the search at 350.

This group of messages is then parsed to form the various n-grams and the rest of the method of FIG. 8 is performed with one exception. That one exception is operation 312, rather than removing n-grams based on frequency of occurrence in the same message, operation 312 is modified to remove those n-grams which themselves are tags.

The computed distance measure computed at 314 takes into account common techniques for making tags, such as deleting spaces, deleting all but the first letter from a word, deleting vowels, writing words in CamelCase, etc. For example, because a tag does not include a space, a space in an n-gram of set S2 is not considered when computing the distance measure. Thus, the tag "#AcademyAward" and the n-gram "Academy Award" may have a zero distance measure, or least a smaller distance measure than would be the case if the space in "Academy Award" was considered in the distance measurement.

After performing the method of FIG. 8 based on the set of messages resulting from the tag-based search and with the modification noted above, the resulting n-gram selected at operation 322 is the selected synonym of the original tag from synonym set S3. The selected synonym provides an indication to the user as to the meaning of the original tag.

In rare cases a single tag has different uses. For example '#HP' could mean "Hewlett-Packard" or "Harry Potter." One way to detect these cases is by using the above-described method over different time windows and then comparing the results. For example, in the period around the opening of a new movie it is most commonly "Harry Potter", while at the time of a corporate results announcement it is most commonly "Hewlett-Packard".

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A non-transitory, computer-readable storage medium containing code that, when executed by a processor, causes the processor to:
   obtain a plurality of n-grams from a plurality of messages;
   determine a temporal histogram for each n-gram;
   determine synonyms among the n-grams based on a correlation of he histograms and a distance measure between n-grams; and
   select from among the synonyms an n-gram for presentation, wherein the selection is based of a difficulty metric.

2. The non-transitory, computer-readable storage medium of claim 1 wherein, when executed, the code causes the processor to compute a similarity measure between n-grams.

3. The non-transitory, computer-readable storage medium of claim 2 wherein, when executed, the code causes the processor to compute the similarity measure by computing a similarity measure based on the correlation of the histograms and the distance measure.

4. The non-transitory, computer-readable storage medium of claim 2 wherein, when executed, the code causes the processor to compute the similarity measure by computing a weighted sum of the correlation of the histograms, the distance measure, and a co-occurrence value.

5. The non-transitory, computer-readable storage medium of claim 1 wherein, when executed, the code causes the processor to compute the distance measure such that the distance measure has a lower value for commonly-used tag creation operations.

6. The non-transitory, computer-readable storage medium of claim 1 wherein, when executed, the code causes the processor to determine synonyms also based on a frequency of occurrence n-grams in a same message.

7. The non-transitory, computer-readable storage medium of claim 1 wherein, when executed, the code causes the processor to determine synonyms by:
   computing a correlation between the histograms;
   determining a set S1 of n-grams whose correlations exceed a threshold;
   thresholding the set S1 based on frequency of occurrence of n-grams in the same message to generate a set S2 of threshoided n-grams;
   computing distance measures between the n-grams;
   computing similarity measures as weighted sums of the correlations and the distance measures;
   thresholding the set S2 based on the similarity measures to produce a set S3; and
   the code, when executed, further causes the processor to compute a difficulty metric of each n-gram in set S3 and select a synonym from the set S3 based on the difficulty metrics.

8. A method, comprising:
   obtaining, by a processor, a plurality of n-grams from a plurality of messages;

determining, by the processor, a temporal histogram for each n-gram;

determining, by the processor, synonyms among the n-grams based on a combination of a correlation of the histograms and a distance measure between n-grams; and selecting, by the processor, an n-gram from the synonyms, wherein the selection is based on a difficulty metric computed for each of a plurality of the n-grams.

9. The method of claim 8 further comprising computing the combination of the correlation of the histograms and the distance measure by computing a weighted sum of the correlation of the histograms and the distance measure.

10. The method of claim 8 further comprising generating the plurality of messages from which the n-grams are obtained by performing a search of messages based on a tag, extracting commonly-occurring concepts from the message set, and searching for other messages containing any of the extracted commonly-occurring concepts.

11. The method of claim 8 wherein determining synonyms among the n-grams comprises determining synonyms also based on a frequency of occurrence of n-grams in a same message.

12. The method of claim 8 wherein determining synonyms among the n-grams comprises:
 computing a correlation between the histograms;
 determining a set S1 of n-grams whose correlations exceed a threshold;
 thresholding the set S1 based on frequency of occurrence of n-grams in the same message to generate a set S2 of thresholded n-grams;
 computing similarity measures as weighted sums of the correlations and the distance measures; and
 thresholding the set S2 based on the similarity measures to produce a set S3; and the method further comprises computing a difficulty metric of each n-gram in set S3 and selecting a synonym from the set S3 based on the difficulty metrics.

13. A system, comprising:
 a temporal histogram engine to determine, via a processor, a temporal histogram for each of a plurality of n-grams from a plurality of messages;
 a correlation engine to compute, via the processor, correlations of the temporal histograms;
 a distance measurement engine to determine, by the processor, character-based distances between n-grams;
 a synonym determination engine to determine, via the processor, a synonym among the n-grams based on the correlations of the histograms and the character-based distances; and
 a difficulty metric engine to compute, via the processor, difficulty metrics for at least some of the n-grams.

14. The system of claim 13 further comprising a same message occurrence engine to determine, via the processor, a frequency of occurrence of correlated n-grams in the same message.

15. The system of claim 13 further comprising a similarity measurement engine to compute, via the processor, a similarity between n-grams based on correlation of histograms and distance measurements from the distance measurement engine.

16. The system of claim 15 wherein the similarity measurement engine is to compute the similarity as a weighted sum of the correlation of histograms and the distance measurements.

17. The system of claim 13 further comprising a synonym selection engine to select, via the processor, a synonym based on the difficulty metrics.

* * * * *